United States Patent
Shea

[19]

[11] Patent Number: 6,074,592
[45] Date of Patent: *Jun. 13, 2000

[54] METHOD FOR IMPARTING CURL TO RIBBON MATERIAL

[75] Inventor: Scott Shea, Berwick, Pa.

[73] Assignee: Berwick Delaware, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/119,501

[22] Filed: Jul. 20, 1998

[51] Int. Cl.⁷ .......................... B29C 35/06; B29C 35/16; B29C 53/60; B29C 53/84
[52] U.S. Cl. .......................... 264/281; 264/322; 264/327; 264/346; 264/348; 264/519; 264/555; 425/384; 425/391; 425/403
[58] Field of Search ........................ 264/157, 237, 264/281, 322, 327, 348, 519, 555, 346, 235; 156/173, 184, 189; 493/459; 425/403, 384, 391, 319

[56] References Cited

U.S. PATENT DOCUMENTS

| | | |
|---|---|---|
| 1,652,855 | 12/1927 | Fernandez . |
| 1,773,580 | 8/1930 | Franke . |
| 2,226,181 | 12/1940 | Ridderstron . |
| 2,384,462 | 9/1945 | Goodman . |
| 2,393,058 | 1/1946 | Pierce et al. . |
| 2,649,393 | 8/1953 | Cumming . |
| 2,669,913 | 2/1954 | Cerone .......................... 93/1 |
| 2,880,540 | 4/1959 | Williams . |
| 3,143,456 | 8/1964 | McGrath et al. . |
| 3,159,873 | 12/1964 | Mylo et al. .......................... 264/348 |
| 3,256,129 | 6/1966 | Wallerstein et al. . |
| 3,327,915 | 6/1967 | Lubin . |
| 3,575,289 | 4/1971 | Brousse .......................... 206/59 |
| 3,591,434 | 7/1971 | Hartstein .......................... 156/178 |
| 3,637,452 | 1/1972 | Sanders . |
| 3,832,841 | 9/1974 | Cole .......................... 57/152 |
| 3,962,957 | 6/1976 | Hinzmann .......................... 93/1 R |
| 3,996,842 | 12/1976 | Ehlich et al. .......................... 93/1 R |
| 4,025,878 | 5/1977 | Predmore .......................... 333/10 |
| 4,044,501 | 8/1977 | Frydryk .......................... 47/26 |
| 4,080,242 | 3/1978 | Komenda et al. .......................... 156/506 |
| 4,138,048 | 2/1979 | Lemmon .......................... 226/152 |
| 4,138,049 | 2/1979 | McAlarney . |
| 4,182,738 | 1/1980 | Casaert et al. .......................... 264/210.2 |
| 4,201,806 | 5/1980 | Cole .......................... 428/4 |
| 4,281,854 | 8/1981 | Savich .......................... 281/21 R |
| 4,324,827 | 4/1982 | Obayashi et al. .......................... 428/192 |
| 4,388,264 | 6/1983 | Leuvelink .......................... 264/281 |
| 4,449,652 | 5/1984 | Coppins et al. .......................... 225/46 |
| 4,532,169 | 7/1985 | Carley .......................... 428/109 |
| 4,681,723 | 7/1987 | Jester .......................... 264/175 |
| 4,713,267 | 12/1987 | Truskolaski .......................... 428/4 |
| 4,721,122 | 1/1988 | Sahm .......................... 132/9 |
| 4,798,754 | 1/1989 | Tomek .......................... 428/74 |
| 4,851,275 | 7/1989 | Yes .......................... 428/131 |

(List continued on next page.)

FOREIGN PATENT DOCUMENTS

| | | |
|---|---|---|
| 3421175 | 12/1985 | Germany . |
| 3421175A1 | 12/1985 | Germany . |
| WO911617 | 10/1991 | WIPO . |

*Primary Examiner*—Jan H. Silbaugh
*Assistant Examiner*—Michael I. Poe
*Attorney, Agent, or Firm*—Seidel, Gonda, Lavorgna & Monaco, PC

[57] ABSTRACT

A method and associated apparatus in which decorative ribbons of varying thickness, width, and material can be automatically curled. The apparatus serves to impart a tendency to curl the strand in a helical formation by drawing the ribbon in a helical path around a curling tube. The tube is divided into two parts, so that the first part heats the ribbon while in a helical configuration and the second part cools the ribbon while still in the helical configuration, thereby setting into the ribbon material a tendency to curl. The helical path on the tube is defined between convolutions of a helically-wound fin on the exterior of the tube. The tube is hollow and has apertures opening into the helical path, so that temperature-controlled air may be blown into the two parts of the path through the hollow interior of the tube.

4 Claims, 1 Drawing Sheet

U.S. PATENT DOCUMENTS

| | | | |
|---|---|---|---|
| 4,884,583 | 12/1989 | Long, Jr. | 132/238 |
| 4,884,826 | 12/1989 | Slagsvol | 281/2 |
| 4,915,996 | 4/1990 | Curry | 428/40 |
| 4,919,980 | 4/1990 | Pirkey | 428/4 |
| 4,952,281 | 8/1990 | Akira | 162/270 |
| 4,968,540 | 11/1990 | Linsenbigler | 428/5 |
| 4,980,922 | 1/1991 | Spargo, Sr. | 7/158 |
| 5,004,144 | 4/1991 | Selga | 229/87.19 |
| 5,036,590 | 8/1991 | Reinke et al. | 30/304 |
| 5,072,865 | 12/1991 | Lyons | 223/46 |
| 5,120,296 | 6/1992 | Yamaguchi et al. | 493/352 |
| 5,122,211 | 6/1992 | Roach | 156/173 |
| 5,154,688 | 10/1992 | Boyd | 493/459 |
| 5,156,893 | 10/1992 | Barthe | 428/4 |
| 5,232,132 | 8/1993 | Broussard et al. | 223/44 |
| 5,257,492 | 11/1993 | Watts | 53/430 |
| 5,383,837 | 1/1995 | Watts | 493/352 |
| 5,395,469 | 3/1995 | Suggs, Jr. et al. | 156/173 |
| 5,400,452 | 3/1995 | Goldstein | 7/135 |
| 5,407,417 | 4/1995 | Goldstein | 493/459 |
| 5,470,620 | 11/1995 | Weder | 428/4 |
| 5,518,492 | 5/1996 | Goldstein | 493/459 |
| 5,711,752 | 1/1998 | Goldstein | 493/459 | ously
METHOD FOR IMPARTING CURL TO RIBBON MATERIAL

FIELD OF THE INVENTION

This invention relates to imparting a curl to one or more ribbon strands.

BACKGROUND OF THE INVENTION

Ribbons and bows are commonly affixed to packages, gifts, and the like. These ribbons and bows serve as reminders of a particular holiday, event, or simply serve as a personal expression of thoughtfulness. Indeed, a carefully packaged, decorative gift with ribbon and/or a bow as a component of the gift wrapping is increasingly recognized as a desirable compliment of any personal, family, or holiday celebration.

In response to consumer demand for increased selection and originality in ribbon and bow designs, manufacturers have introduced various ribbon arrangements. These arrangements may typically include multi-colored ribbons of varying width, thickness, patterns, and colors which are typically wound, packaged and sold individually. The ribbon may be processed by hand to impart a curl to the ribbon material, resulting in a pleasing combination of grouped sections of multi-colored helically coiled ribbons where a number of ribbons are grouped together.

Curl in a flat ribbon is typically created by running the ribbon material lengthwise across a sharp edge.

Collections of ribbons may be packaged by attaching the ribbon configured in an aesthetically pleasing collection arrangement to a cardboard placard for positioning on a retail display. Upon purchase, the ribbons may be detached from the packaging and affixed to a gift box by way of adhesive included on the underside of the ribbon arrangement or supporting placard.

While aesthetically appealing, hand fabricated collections of ribbons are cost prohibitive for many consumers.

Consumers have grown accustomed to machine produced ribbons and ribbon collections which are less expensive, due to the lack of manual labor required for their creation.

SUMMARY OF THE INVENTION

A method in which decorative ribbons of varying thickness, width, and material can be automatically curled is provided.

The method of imparting the curl to the ribbon is accomplished through the application of controlled temperature to a ribbon strand advancing along a travel path. The ribbon is wound around a mandrel or tube as a helix or spiral and is heated preferably to a predetermined temperature and then preferably cooled along the ribbon travel path to impart a curling tendency to the ribbon. The ribbon travel path preferably spirals about the periphery of preferably hollow threaded tubes such that apertures formed therein exhaust temperature-controlled air for imparting and setting a curl to the ribbon traveling around the tube.

Still other benefits and advantages of this invention will become apparent to those skilled in the art upon a reading and understanding of the following detailed specification and related drawings.

BRIEF DESCRIPTION OF THE DRAWINGS

The foregoing summary, and the following detailed description, will be best understood when read in conjunction with the attached figures, in which.

DESCRIPTION OF THE PREFERRED EMBODIMENTS

Figure 1:
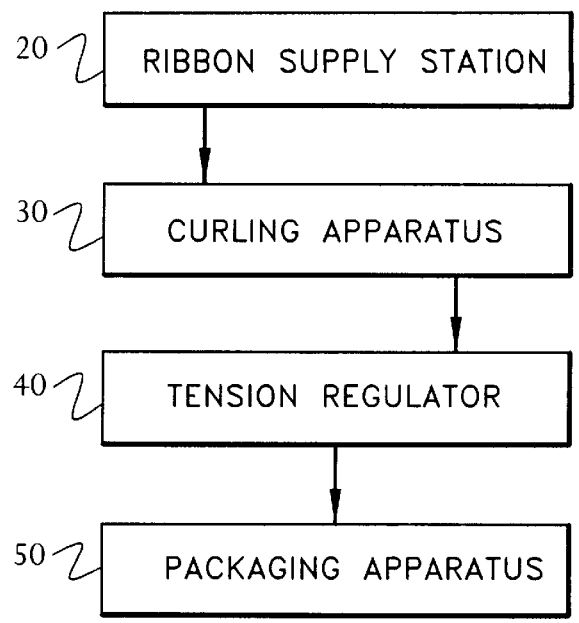
FIG. 1 is a block diagram showing a preferred apparatus for performing the method of the present invention.
Figure 2:
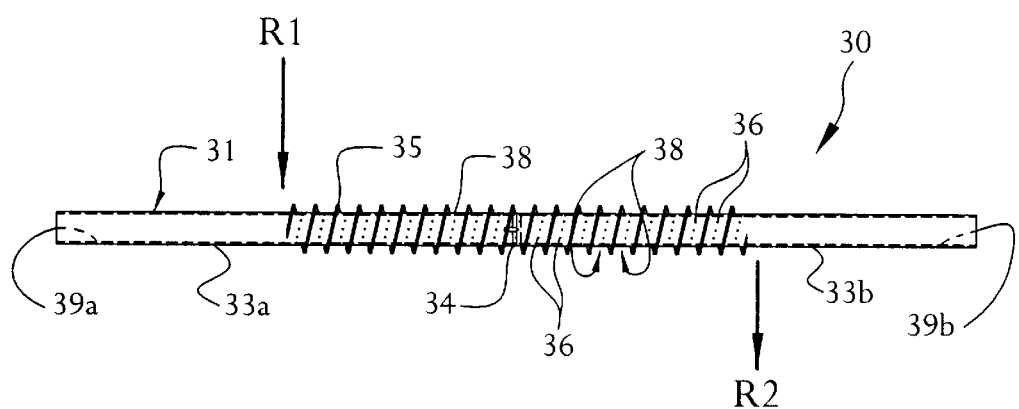
FIG. 2 is plan view of a curling tube which may used in the apparatus diagrammed in FIG. 1.

Referring to FIGS. 1 and 2, a ribbon supply station 20 preferably mounts a plurality of ribbon spools containing strands of ribbon for feeding continuous strands of untreated ribbons to a curling apparatus 30. The curling apparatus 30 imparts a tendency to curl in the ribbon strands while they are under a tension controlled by a tension regulator 40. The strands are discharged from the tension regulator 40 to packaging apparatus 50, which cuts the ribbon strands to a suitable length for packaging and/or for transfer to further manufacturing operations.

The ribbon supply station 20 preferably has drive rollers (not shown) for withdrawing strands of ribbon from the supply and advancing each strand to the curling apparatus 30, so that the individual strands are under constant tension control between the supply station 20 and the tension regulator 40. The constant tension control enables the strands to be given a tendency to curl, but to be manipulated without actually curling and becoming entangled with themselves or with other strands.

In the curling apparatus 30, the ribbon enters the apparatus as indicated by the arrow R1, and is wrapped around a hollow curling tube 31 (see FIG. 2) in a helical path around the external cylindrical surface of the tube. The tube is separated into two parts 33a and 33b by a central plug 34. In the first part 33a, the strand of ribbon is heated while in the helical configuration, and in the second part 33b, the strand is cooled while in the same helical configuration, the heating and cooling of the ribbon strand imparting a tendency for the strand to curl. The ribbon strand is discharged from the curling apparatus 30 as indicated by the arrow R2 in FIG. 2.

From the curling tube of the curling apparatus 30, the strands are fed to the tension regulator 40. Sufficient tension is applied to the strand by the tension regulator to resist the tendency of the strand to curl so that it travels through the curling apparatus 30 and the tension regulator 40 without curling. Upon discharge from the tension regulator 40, the strands are processed in the packaging unit 50.

In the preferred embodiment of the curling apparatus 30, the curl tube 31 has a fin 35 forming a helical guide path, such as a groove or channel 38 around the external cylindrical periphery of the curl tube. As shown in FIG. 2, the curl tube fin 35 is wound counterclockwise when viewed in the direction of travel. The ribbon is directed onto the tube under the top as shown in FIG. 2 and is withdrawn over the top. The helical curl set in the strands by the tube is clockwise. A curl of the opposite hand may be set in the strand by using a tube having a clockwise-wound fin. The ribbon strand is threaded within the guide path 38 (see FIG. 2) in contact with both parts 33a and 33b of the outer cylindrical surface of the tube 31. After traveling the length of the helical path 38 formed between the fin convolutions 35, the ribbon strand is withdrawn into the tension regulator 40.

Preferably, the spacing between the convolutions of the fin 32 corresponds to the width of the widest strand of ribbon which is to be fed through the helical guide path 38. The maximum spacing of the convolutions will accommodate ribbons of any width up to the maximum. The spacing between the convolutions of the fins may be accommodated to the individual widths of the ribbons. The ribbons have at least one flat face to ride on the cylindrical exterior surface of the curl tube 31 so as to maximize the heat transfer between the traveling ribbon and the curl tube.

When the ribbon travels in the helical path wrapped around the tube 31, it is subjected to first heating and then cooling, so as to create a tendency for the ribbon to curl into a helix conforming to the path. In the present instance, the heating and cooling of the ribbon strand is accomplished through the application of temperature-controlled air to the strand as it is advanced through the ribbon path 38.

As shown in FIG. 2, the curling tube 31 is hollow and has a central plug 34 dividing the hollow interior of the tube into a left-hand chamber 39a and right-hand chamber 39b within the parts 33a and 33b respectively. The tube is provided with apertures 36 between the convolutions of the fin 35 affording fluid communication between the hollow bores of the parts 33a and 33b, and the helical path 38 defined between the convolutions of the fin 35. The plug 34 divides the helical path 38 into a first part on the surface of the part 33a, and a second part on the surface of the part 33b. The chambers 39a and 39b are supplied with temperature-controlled air. The chamber 39a is supplied by an air heater (not shown, which directs heating air into the left chamber 39a of the curling tube 31. Cooling air is supplied to the right chamber 39b of the curling tube through feed tubes (not shown) so as to exhaust cooling air through the apertures 36 in the second part of the helical path. Thus, as the ribbon is advanced in the helical path around the cylindrical circumference of the tube, the ribbon is first subjected to heating by the heating air exhausted from the chamber 39a in the part 33a and then is subjected to cooling air exhausted from chamber 39b in the part 33b with the flat ribbon being wrapped with its face in engagement with the cylindrical surface of the tube so as to assume a helical configuration. In the first part of the helical path 38, the ribbon strand is heated to a sufficiently high temperature to allow the ribbon to assume a helical set without destruction of the continuity of the ribbon. The helical set is fixed in the ribbon by the passage through the cooling part of the path 38. Air is supplied through an air supply (not shown) having suitable filters.

The ribbon strand exiting from the remote end of the curl tube at R2 is advanced into the tension regulator 40 which serves to maintain sufficient tension on the ribbon to overcome the tendency of the ribbon to curl imparted by the curl tube 31.

The packaging unit 50 may include a cutter mechanism (not shown) to sever predetermined lengths of ribbon from the continuous length of ribbon discharged from the tension regulator. Prior to the severing, and while still under tension, the predetermined lengths of ribbons may be stacked and stapled to a placard. When severed and released from tension, the strands curl uppon themselves to form a decorative element.

Although a single embodiment of curling apparatus has been described and illustrated in this application, it is not intended to limit the invention as disclosed, but changes and modifications may be made therein and thereto within the scope of the following claims.

What is claimed is:

1. A method for curling ribbon to create a decorative element, comprising the steps of:
    a. feeding at least one ribbon strand having a flat face to a curling apparatus having a cylindrical exterior surface including a ribbon strand guide means defining a helical ribbon path around said exterior surface, said helical ribbon path having a first part and a second part;
    b. directing said ribbon strand along said helical ribbon path within said ribbon strand guide means with said flat face wrapped around and in facing contact with said exterior surface under constant tension control;
    c. heat-treating said ribbon strand by heating said ribbon strand in the first part of the path by directing temperature-controlled air onto said flat face of said ribbon strand and cooling said ribbon strand in the second part of the path by directing temperature-controlled air onto said flat face of said ribbon strand, said heating and cooling of said ribbon strand while wrapped around said exterior surface imparting to the heat-treated ribbon strand a tendency to curl; and
    d. withdrawing said heat-treated ribbon strand from said ribbon strand guide means.

2. A method of curling a ribbon according to claim 1 wherein said apparatus comprises a hollow curling tube with discharge apertures in registry with said helical path, and said temperature-controlled air flows through said hollow tube interior and out through said discharge apertures, heating air being discharged through apertures in registry with the first part of said path, and cooling air being discharged through apertures in registry with the second part of said path.

3. A method for curling ribbon comprising:
    a. feeding at least one ribbon strand to a curling apparatus having an exterior surface including a ribbon strand guide means defining a helical ribbon path having first and second parts;
    b. advancing said ribbon strand having a flat face along said exterior surface within said ribbon strand guide means with said flat face contacting said surface under constant tension control;
    c. heat-treating said ribbon strand by heating said ribbon strand flat face during contacting travel along said first part of said path by directing temperaure-controlled heating air onto said ribbon strand flat face and cooling said ribbon strand flat face during contacting travel along said second part of said path by directing temperature-controlled cooling air onto said ribbon strand flat face thereby imparting a tendency to curl to said ribbon strand; and
    d. withdrawing said ribbon strand from said ribbon strand guide means.

4. A method of curling ribbon according to claim 3 wherein said curling apparatus is a hollow curling tube having discharge apertures for communication of the hollow tube interior with said exterior surface and said temperature-controlled heating air flows through a heating portion of said hollow curling tube corresponding to said first part and out through said discharge apertures in said heating portion with said temperature-controlled cooling air being discharged through apertures in a remaining portion of said hollow curling tube corresponding to said second part.

* * * * *